United States Patent [19]

Kobayashi et al.

[11] Patent Number: 5,236,018

[45] Date of Patent: Aug. 17, 1993

[54] BORING CASING FOR BORING MACHINES

[75] Inventors: Akira Kobayashi; Naohiro Ohori; Hiroyuki Yoshizawa, all of Tokyo, Japan

[73] Assignee: Tao Nenryo Kogyo Kabushiki Kaisha, Japan

[21] Appl. No.: 935,135

[22] Filed: Aug. 24, 1992

Related U.S. Application Data

[63] Continuation of Ser. No. 686,108, Apr. 16, 1991, abandoned, which is a continuation of Ser. No. 338,266, Apr. 14, 1989, abandoned.

[30] Foreign Application Priority Data

Jun. 24, 1988 [JP] Japan .................. 63-156140
Mar. 31, 1989 [JP] Japan .................. 1-82846

[51] Int. Cl.⁵ .................................................. F16L 9/22
[52] U.S. Cl. ............................ 138/172; 138/109; 138/130; 138/174; 138/139
[58] Field of Search .............. 138/130, 172, 174, 109, 138/129, 132, 153, 139; 464/179, 180, 181, 183; 166/242

[56] References Cited

U.S. PATENT DOCUMENTS

| 215,481 | 5/1879 | Pider | 138/109 |
|---|---|---|---|
| 1,205,987 | 11/1916 | Girten et al. | 138/109 |
| 2,965,151 | 12/1960 | Elliott et al. | 138/126 |
| 3,531,143 | 9/1970 | Horvath et al. | 138/109 |
| 3,537,484 | 11/1970 | McCarty | 138/109 |
| 4,236,386 | 12/1980 | Yates et al. | 138/109 |
| 4,248,062 | 2/1981 | McLain et al. | |
| 4,385,644 | 5/1983 | Kaempen | 138/109 |
| 4,407,528 | 10/1983 | Anthony | 138/109 |
| 4,421,497 | 12/1983 | Federman et al. | 138/109 |
| 4,428,602 | 1/1984 | Lambot et al. | 138/109 |
| 4,530,379 | 7/1985 | Policelli | 138/141 |
| 4,605,385 | 8/1986 | Pück et al. | 138/109 |

FOREIGN PATENT DOCUMENTS 2271024 12/1975 France .

Primary Examiner—James E. Bryant, III
Attorney, Agent, or Firm—Seidel, Gonda, Lavorgna & Monaco

[57] ABSTRACT

A bar-like molding made of fiber-reinforced plastic materials of the type which can be extended by connecting pieces thereof, comprises a fiber-reinforced plastic covering layer formed by laminating a plurality of fiber-reinforced plastic layers and short length metal pipes for connection arranged at the ends of the fiber-reinforced plastic covering layer, the fiber-reinforced plastic covering layer including an inner fiber-reinforced plastic covering layer composed of a plurality of fiber-reinforced plastic layers and abutting at its ends against the respective inner end surfaces of the short length metal pipes for connection, and an outer fiber-reinforced plastic covering layer composed of a plurality of fiber-reinforced plastic layers and formed in such a manner as to cover the outer peripheries of said inner fiber-reinforced plastic covering layer and the short length metal pipes for connection, the reinforcing fibers of at least one of the plurality of fiber-reinforced plastic layers of at least one of the outer reinforced plastic covering layer and the inner reinforced plastic covering layer being arranged in the axial direction of the bar-like molding. Preferably, at least the outermost layer of the outer fiber-reinforced plastic covering layer is formed as a layer whose reinforcing fibers are arranged 90° to the axial direction.

10 Claims, 6 Drawing Sheets

BORING CASING FOR BORING MACHINES

This is a continuation of Ser. No. 07/686,108 filed Apr. 16, 1991, abandoned which is a continuation of Ser. No. 07/338,266 filed Apr. 14, 1989, abandoned.

BACKGROUND OF THE INVENTION

1. Field of the Invention

This invention generally relates to a hollow pipe or a solid shaft made of a fiber-reinforced plastic material (hereinafter referred to as a "bar-like molding make of a fiber-reinforced plastic material") and a method of manufacturing the same. More specifically, this invention relates to a bar-like molding made of a fiber-reinforced plastic material which can be extended through connection, and in particular to one which is suitable for transmitting torque and impulsive force. For example, it is suited to be used as a component of the connected drilling pipe assembly of a boring machine in the fields of civel engineering, oil drilling, etc., or as a propeller shaft for transmitting the torque of a transport machine such as an automobile, a ship or an airplane. It goes without saying that the use of the bar-like molding made of a fiber-reinforced plastic material of this invention is not limited to the transmission of torque or impulsion. It is also suited for use as a high-strength structural material subjected to tensile force and compressive force such as pillars and beams in a building or piping the transporting fluids.

2. Description of the Prior Art

As the connected drilling pipes of a boring machine, for example, steel pipes have conventionally been employed. When using steel pipes as the components of a connected pipe assembly, i.e., as drilling pipes, a male screw is formed at one end of each pipe and a female screw at the other end thereof previously, adjacent pipes being directly connected to each other by engaging the male and female screws formed at the ends. By thus connecting pipes, a pipe assembly of any desired length can be obtained. Alternatively, both ends of each pipe may be formed as female screws, adjacent screws being connected to each other through the intermediary of a connecting short pipe having male screws.

Being made of steel, conventional drilling pipes are attended by the following problems:

(1) Since they are relatively heavy, the operation of connecting them together for extension is labor intensive. This is especially true if the working site is located in a tunnel or on a slope of a mountain. Under such bad conditions, various problems such as prolonged working time and danger in conveying and connecting the pipes may be involved. Their heaviness is inconvenient not only in terms of operational efficiency; if a boring operation is to be performed as deep as several thousands of meters, the weight of the drilling pipes themselves will amount to several hundreds of tons, so that a special support structure may be required for them.

(2) When acid treatment is performed, as in boring for petroleum and natural gas, the hydrochloric acid used will corrode the drilling pipes.

With a view to overcoming these problems, the applicant of the present invention proposed an extension pipe made of fiber-reinforced plastic materials which comprises a hollow pipe made of fiber-reinforced plastic materials and connecting short length metal pipes having a predetermined length and attached to the ends of the hollow pipe, the short length metal pipes including male or female screws for connection (see Japanese Patent Application Kokai Nos. 63-167185 and 63-167184).

The fiber-reinforced plastic pipe proposed is quite advantageous in that it can well withstand percussions and that its weight can be about ½ of a conventional steel pipe. However, it is not satisfactory as a pipe for transmitting a high torque.

In this regard, the applicant of this invention discovered the fact that a considerably high torque amounting up to 600 kg.m can be transmitted when an uneven surface configuration is imparted by knurlizing or the like to the outer peripheral surface of a connecting short length metal pipe adapted to be engaged with the inner peripheral surfaces at the ends of a hollow fiber-reinforced plastic pipe, and proposed a fiber-reinforced plastic pipe accordingly constructed (Japanese Patent Application No. 62-260754).

It has been found, however, that, when used for percussion boring, the fiber-reinforced plastic material pipe disclosed in Japanese Patent Application Kokai Nos. 63-167185 and 63-167184 and that proposed in Japanese Patent Application No. 62-206574 can provide only a lower boring speed, i.e., a poorer boring efficiency, as compared with conventional steel boring casings.

The inventors of the present invention conducted a number of experiments with a view to improving the boring efficiency of a fiber-reinforced plastic pipe, and have discovered the fact that, by increasing its axial stiffness, the impulsion transmitting properties of a fiber-reinforced plastic pipe can be augmented, thereby remarkably improving the boring efficiency thereof. In some cases, a boring casing utilizing fiber-reinforced plastic pipes can provide a boring efficiency equal or superior to that provided by conventional boring casings using steels.

The present invention is based on this newly obtained knowledge.

SUMMARY OF THE INVENTION

It is accordingly an object of this invention to provide an improved bar-like molding made of a fiber-reinforced plastic in the form of a hollow pipe or a solid shaft of the type which can be extended through connection; this invention aims at providing a bar-like molding of the above-described type which has a relatively light weight, which involves no corrosion problems, and which can transmit a relatively high torque and impulsion, withstand percussion, and provide a high axial stiffness, so that it can improve the boring efficiency when used as a component of a boring casing. Another object of this invention is to provide a method of manufacturing a bar-like molding made of a fiber-reinforced plastic material having the characteristics described above.

In accordance with this invention, there is provided a bar-like molding made of fiber-reinforced plastic materials of the type which can be extended by connecting pieces thereof, comprising a fiber-reinforced plastic covering layer formed by laminating a plurality of fiber-reinforced plastic layers and short length metal pipes for connection arranged at the ends of the fiber-reinforced plastic covering layer, said fiber-reinforced plastic covering layer including an inner fiber-reinforced plastic covering layer composed of a plurality of fiber-reinforced plastic layers and abutting at its ends against the respective inner end surfaces of said short length metal pipes for connection, and an outer fiber-reinforced plastic covering layer composed of a plurality of fiber-reinforced plastic layers and formed in such a manner as to cover the outer peripheries of said inner fiber-reinforced plastic covering layer and said short length metal pipes for connection, the reinforcing fibers of at least one of said plurality of fiber-reinforced plastic layers of at least one of said outer reinforced plastic covering layer or said inner fiber-reinforced plastic covering layer being arranged in the axial direction of the bar-like molding. Preferably, at least the outer fiber-reinforced plastic covering layer has a fiber-reinforced plastic layer whose reinforcing fibers are arranged in the axial direction. Furthermore, the outer peripheries of the short length metal pipes are equipped with an uneven surface configuration. This bar-like molding made of fiber-reinforced plastic materials is realized in the form of a hollow pipe or a solid shaft. Preferably, at least the outermost layer of the outer fiber-reinforced plastic covering layer is formed as a layer whose reinforcing fibers are arranged 90° to the axial direction, and more preferably, an innermost layer of the inner fiber-reinforced plastic covering layer is also formed as a layer whose reinforcing fibers are arranged 90° to the axial direction.

In accordance with this invention, there is also provided a method of manufacturing a bar-like molding made of fiber-reinforced plastic materials, comprising at least the steps of: (a) preparing a mandrel composed of a main body section having a predetermined diameter and a predetermined length, and an end section integrally connected to said main body section and having a reduced diameter; (b) forming on the main body section of the mandrel an inner fiber-reinforced plastic covering layer composed of a plurality of fiber-reinforced plastic layers with a predetermined thickness, and curing it, as needed; (c) inserting short length metal pipes for connection onto the end sections of said mandrel, abutting them against the ends of said inner fiber-reinforced plastic covering layer; (d) forming an outer fiber-reinforced plastic covering layer of a predetermined thickness, covering the outer peripheries of said inner fiber-reinforced plastic covering layer and said short length metal pipes for connection, and curing it, as needed, the reinforcing fibers of at least one of said plurality of fiber-reinforced plastic layers of at least one of said outer reinforced plastic covering layer or said inner reinforced plastic covering layer being arranged in the axial direction; and (e) pulling out said mandrel along the axial direction, as needed.

The fiber-reinforced plastic layers of the inner and outer fiber-reinforced plastic covering layers are formed by the filament winding method using impregnated fibers, or the winding method using prepreg.

DETAILED DESCRIPTION OF THE PREFERRED EMBODIMENTS

Figure 1:
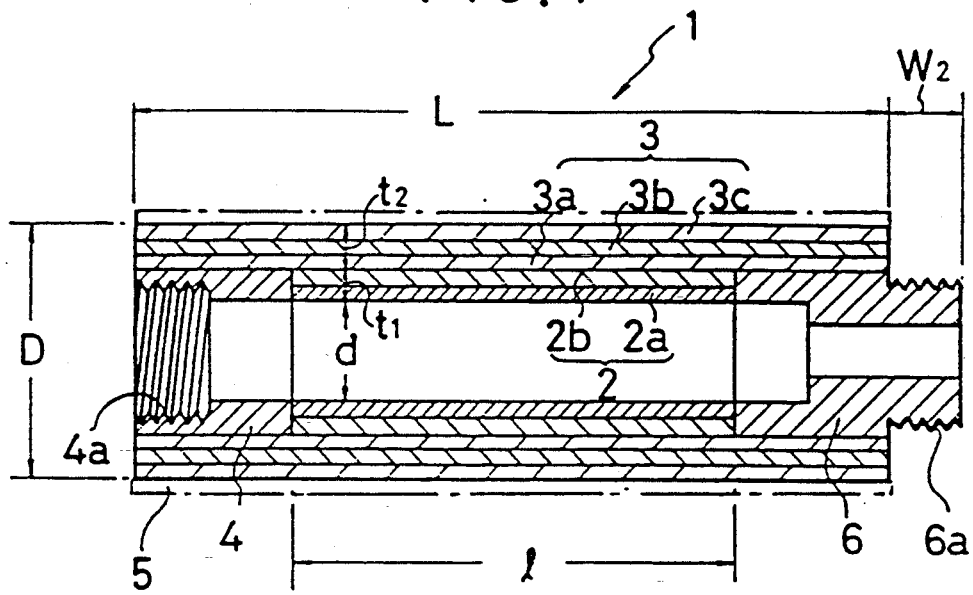
FIG. 1 is a sectional view of an embodiment of the bar-like molding made of fiber-reinforced plastic materials of this invention.

Embodiments of the bar-like fiber-reinforced plastic molding of this invention will now be described in more detail with reference to the accompanying drawings.

In the embodiment shown in FIG. 1, the bar-like fiber-reinforced plastic molding of this invention is realized, in particular, in the form of a hollow pipe made of fiber-reinforced plastic materials (hereinafter referred to as an "FRP pipe").

The FRP pipe 1 of this invention comprises a fiber-reinforced plastic covering layer 2–3 formed by laminating a plurality of fiber-reinforced plastic layers, and short length metal pipes for connection 4 and 6 which are arranged at the ends of the fiber-reinforced plastic covering layer.

More specifically, the fiber-reinforced plastic covering layer includes an inner fiber-reinforced plastic covering layer or an inner pipe 2 having a length l, an inner diameter d and a wall thickness t1. The end surfaces of the inner pipe 2 abut the respective inner end surfaces of the short length metal pipes for connection 4 and 6. Further, the inner pipe 2 is composed of a plurality of fiber-reinforced plastic layers; in this embodiment, it consists of two fiber-reinforced plastic layers 2a and 2b, the reinforcing fibers of the fiber-reinforced plastic layer 2b being arranged in the axial direction. The innermost layer 2a serves as a protective layer in this embodiment, and is preferably formed from glass fiber cloth prepreg.

The fiber-reinforced plastic covering layer further includes an outer fiber-reinforced plastic covering layer or an outer pipe 3 laminated in such a manner as to cover the outer peripheries of the inner pipe 2 and the short length metal pipes 4 and 6. The outer pipe 3 is composed of a plurality of laminated fiber-reinforced plastic layers and has a length L, an outer diameter D and a wall thickness t2. In this embodiment, the outer pipe 3 consists of three fiber-reinforced plastic layers 3a, 3b and 3c, the reinforcing fibers of at least one of which (in this embodiment, the fiber-reinforced plastic layer 3b) are oriented along the axial direction.

As needed, a protective layer 5 may be provided outside the outermost layer 3c of the outer pipe 3. When, for example, the FRP pipe 1 is used as a boring casing, the protective layer 5 serves to prevent the surface of the FRP pipe 1 from being worn severely. The protective layer 5 will be described in more detail below.

A female screw 4a is formed at one end of the short length metal pipe 4, and a male screw 6a which can be engaged with this female screw 4a is formed at one end of the short length metal pipe 6. As shown in the drawing, the male screw section 6a protrudes outwardly beyond the outer pipe 3. A plurality of FRP pipes 1 thus constructed may be connected to each other by engaging the female screw 4a of one FRP pipe with the male screw 6a of another. Thus, a pipe assembly of any desired length can be obtained.

Figure 2:
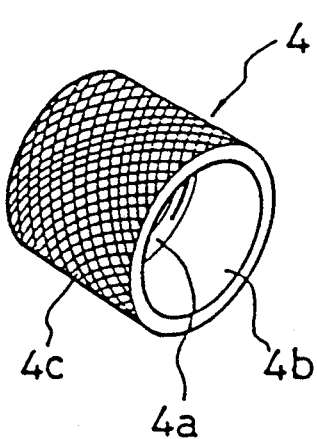
FIGS. 2 and 3 are perspective view of the short length metal pipes for connection used in the bar-like molding made of fiber-reinforced plastic materials of this invention shown in FIG. 1.
Figure 3:
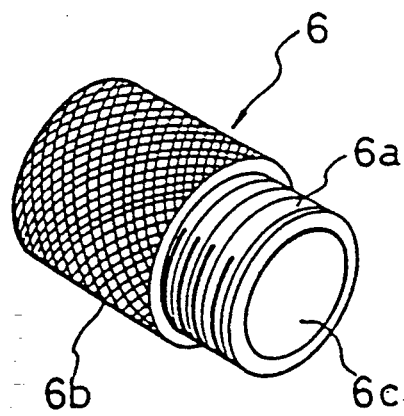

As shown in FIGS. 2 and 3, an uneven surface configuration is imparted to the respective outer peripheries 4c and 6b of the short length metal pipes 4 and 6. This uneven surface configuration may be realized by knurlizing; it may, for example, be the flat cut or the double cut prescribed in JIS B 0951. For example, it may be a flat cut or a double cut with 0.5 module (m). Alternatively, the knurlizing angle (the angle the double cut makes with the axial direction) may be changed from the 30° prescribed in JIS to 45. Or, the knurlizing may be effected in such a manner that each mesh has a flat top.

The uneven surface configuration thus imparted to the respective outer peripheries of the short length metal pipes 4 and 6 enables these metal pipes to be connected to the inner peripheral sections at the ends of the fiber-reinforced plastic layer 3a so firmly that a considerably high torque can be transmitted through this connection. More preferably, the configuration of the inner peripheral sections at the ends of the fiber-reinforced plastic layer 3a and that of the outer peripheries of the short length metal pipes engaging therewith may have a non-circular configuration such as an oval or a polygonal one. This makes it possible to transmit a considerably high torque through the connected pipes.

The inner fiber-reinforced plastic covering layer (inner pipe) 2 and the outer fiber-reinforced plastic covering layer (outer pipe) 3 will now be described in more detail.

As stated above, in this embodiment the inner most layer 2a of the inner pipe 2 serves as the protective layer for the FRP pipe 1. For example, it may be formed from glass fiber cloth prepreg. On the other hand, the layer 2b serves to augment the stiffness in the axial direction of the inner pipe 2. It is formed as a fiber-reinforcing plastic layer, the reinforcing fibers of which are arranged in the axial direction. In particular, the reinforcing fibers used may be carbon fibers. Preferably, they will be carbon fibers having a high elastic modulus or an ultrahigh elastic modulus, for example, carbon fibers having an elastic modulus in the range 400 to 800GPa.

Instead of carbon fibers, glass fibers or aramid fibers may be employed as the reinforcing fibers of the fiber-reinforced plastic layer 2b. As the matrix resin, thermosetting resins such as epoxy resin, unsaturated polyester resin, urethane acrylate, vinyl ester, phenol, or polyurethane may be used, and thermoplastic resins such as nylon 6, nylon 66, nylon 12, PBT, PET, polycarbonate, polyacetal, polyphenylene sulfide, polyether ether ketone, polyether sulfide, polyphenylene oxide, HO-RYL ®; polypropylene, or polyvinyl chloride may be used. Fillers such as $CaCO_3$, mica, $Al(OH)^3$ and talc may be added thereto. Furthermore, additives and coloring agents for improving heat resistance and weather resistance may be added thereto.

The innermost layer 3a and the outermost layer 3c of the outer pipe 3 are formed as fiber-reinforced plastic layers for improving the torque characteristics of the pipe, the reinforcing fibers thereof being arranged 45° from the axial direction. In particular, the reinforcing fibers of the layers 3a and 3c may be carbon fibers, and more preferably, carbon fibers having a tensile strength of 3000 to 5000 MPa and an elastic modulus of 240 to 500 GPa. On the other hand, the middle layer 3b of the outer pipe 3 is formed as a layer for increasing the stiffness in the axial direction of the outer pipe 3. In particular, its reinforcing fibers may be carbon fibers. The carbon fibers employed are preferably ones having a high elastic modulus or an ultrahigh elastic modulus, and more preferably, carbon fibers having an elastic modulus in the range of 400 to 800 GPa.

Instead of carbon fibers, glass fibers or aramid fibers may be employed for the fiber-reinforced plastic layers 3a, 3b and 3c. The matrix resin used for them may be selected from among those mentioned above.

The fiber-reinforced plastic layers 2a, 2b, 3a, 3b and 3c may be formed by the winding method using prepreg, or by the filament winding method using impregnated fibers. Furthermore, it is also possible to use prepreg for particular layers, forming the other layers by the filament winding method.

As stated above, a protective layer 5 may be provided outside the outermost layer 3c of the outer pipe 3, as needed.

While the protective layer 5 is preferably formed from glass fiber cloth prepreg, it may also be formed in accordance with the following methods:

(1) Coating with an abrasion proof resin

A resin containing a ceramic powder such as EC Barrier (trade name by ASAHI CERACOAT Kabushiki-Kaisha) or hard particles (with a Moh's hardness of 4 to 5) such as stainless flakes, e.g., Stainless Bright Coat (trade name by ASAHI CERACOAT Kabushiki-Kaisha) may be applied to the outermost layer with a coating thickness of 0.5 to 1 mm, and be cured at room temperature or by heating to form an abrasion proof layer. The resin used as the base will preferably be an epoxy resin, etc.

(2) Coating with polyurethane resin

Since polyurethane resin cannot be directly applied to the outermost surface of the FRP pipe 1, the surface of the FRP pipe 1 must be made conductive first. When the outermost layer of the FRP pipe 1 consists of a fiber-reinforced plastic layer having carbon fibers, its surface could be scraped off to expose the carbon fibers for the purpose of obtaining the requisite conductivity. However, this will entail strength degradation due to damage of the surface. It is desirable that the conductivity of the outer surface required be obtained by winding metal mesh, metal foil or the like around the outermost layer, allowing them to become hardened simultaneously with the outermost layer. When using metal mesh, cloth-like stainless steel mesh having a fine mesh of about #400 is preferable. For metal foil, aluminum foil is preferable.

(3) Covering with a metal sleeve

After forming the FRP pipe 1, the outer surface thereof is cut so as to make even its outer diameter. An adhesive agent is then applied to the surface, and a metal sleeve with a thickness of about 1 mm, for example, is put on it and made to adhere thereto. The metal sleeve used will preferably be an SUS material.

(4) Metal mesh coating

Metal mesh impregnated with resin is wound around the outer layer of the FRP pipe 1, and is cured by heating it along with the FRP pipe 1, thereby providing a metal layer on the surface. The metal mesh used is preferably a cloth-like stainless steel mesh having a fine mesh of about #400. The impregnated resin may be the above-mentioned matrix resin for the above-mentioned prepreg such as epoxy resin.

(5) Coating with aramid fiber cloth

Aramid fiber cloth prepreg is wound around the outer layer of the FRP pipe 1, and is cured by heating.

(6) Aramid stitching Carbon Fiber cloth

Aramid stitching Carbon Fiber cloth formed by vertically sewing aramid fibers in Carbon Fiber cloth is wound around the outer layer of the FRP pipe 1, and is cured by heating.

(7) Coating with a heat-shrinkable Teflon tube

After forming the FRP pipe 1, a heat-shrinkable Teflon tube is put on its outer surface, causing the tube to shrink when heated.

(8) Nickel electrocoating

When the outer layer of the FRP pipe 1 consists of a fiber-reinforced plastic layer of carbon fibers, the surface of the outer layer may be scraped off to expose the carbon fibers, thereby making the surface conductive. A copper layer having a thickness of 50 $\mu$m is then formed by applying a conductive coating material thereto. Then, a nickel electrocoating layer having a thickness of 100 $\mu$m is formed.

As described above, both the inner fiber-reinforced plastic covering layer (inner pipe) 2 and the outer fiber-reinforced plastic covering layer (outer pipe) 3 are formed by laminating a plurality of fiber-reinforced plastic layers, the reinforcing fibers of at least one of the plurality of layers being arranged in the axial direction for both the inner and outer pipes 2 and 3. In accordance with this invention, however, it may be at least either the inner pipe 2 or the outer pipe 3 that includes at least one layer whose reinforcing fibers are arranged in the axial direction.

Thus, in accordance with this invention, at least one of the plurality of layers making up the inner pipe 2 and/or the outer pipe 3 is formed as a layer whose reinforcing fibers are arranged in the axial direction. This augments the stiffness in the axial direction of the FRP pipe 1 and improves the impulsion transmission characteristics thereof, with the result that the boring efficiency thereof is enhanced.

Figure 4:
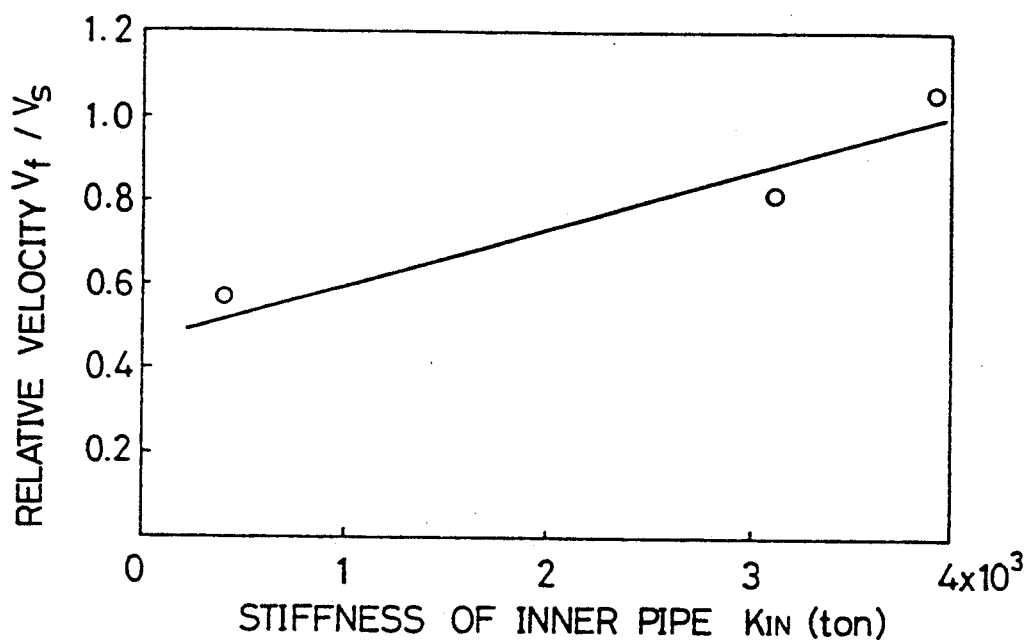
FIG. 4 is a graph showing the relationship between the stiffness of the inner pipe and the relative velocity.
Figure 5:
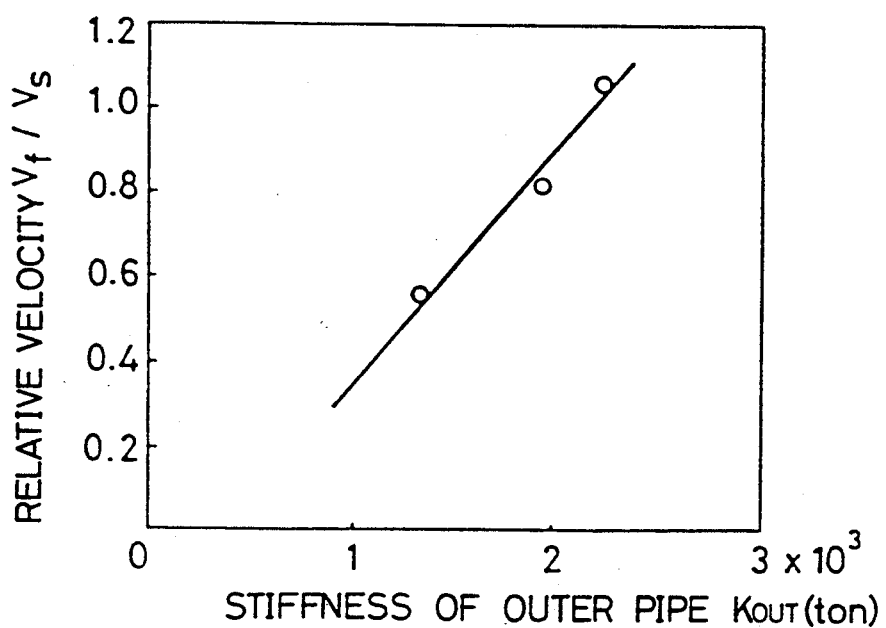
FIG. 5 is a graph showing the relationship between the stiffness of the outer pipe and the relative velocity.

FIGS. 4 and 5 show the relationship between the stiffness and the boring efficiency of the inner and outer pipes 2 and 3. In FIGS. 4 and 5, the boring efficiency is represented by the ratio of the boring speed of an FRP pipe 1 (Vf) to that of a steel casing (Vs), i.e., the relative speed (Vf/Vs). As will be appreciated from FIGS. 4 and 5, the boring efficiency is heightened as the stiffness in the axial direction of the inner and outer pipes 2 and 3 increases.

Figure 6:
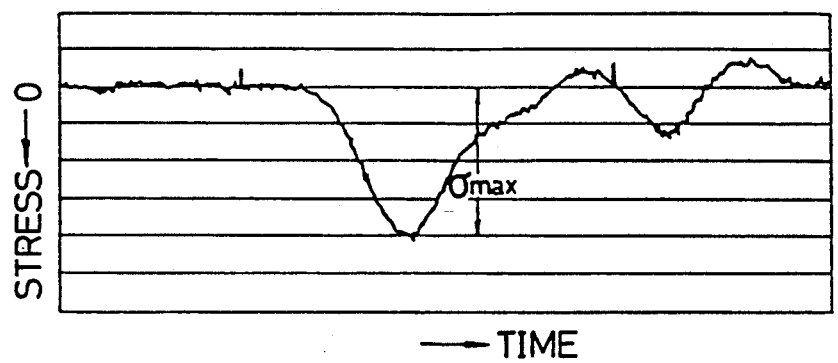
FIGS. 6 to 8 are graphs showing the relationship between the stiffness of the bar-like molding made of fiber-reinforced plastic materials and the impulsive transmission characteristics thereof.
Figure 7:
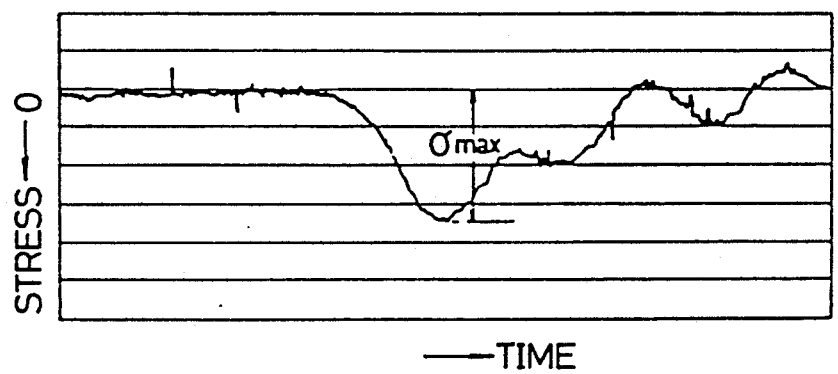
Figure 8:
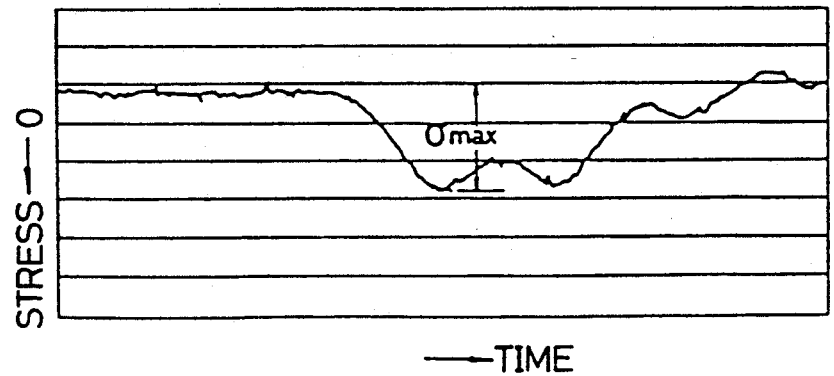

Furthermore, as will be appreciated from the result of an impulsive stress measurement plotted on the graphs of FIGS. 6 to 8, the impulsion transmission characteristics of the FRP pipe 1 improve as the stiffness thereof in the axial direction increases. The stiffness in the axial direction of the FRP pipe 1 decreases in order from FIG. 6 to FIG. 8. As will be appreciated from these drawings, the maximum impulsive stress ($\sigma$max), which is transmitted to the measurement tube from the other end of the FRP pipe 1 after being propagated therethrough as a result of the same impulsion applied to one end thereof, decreases in the above order.

Figure 9:
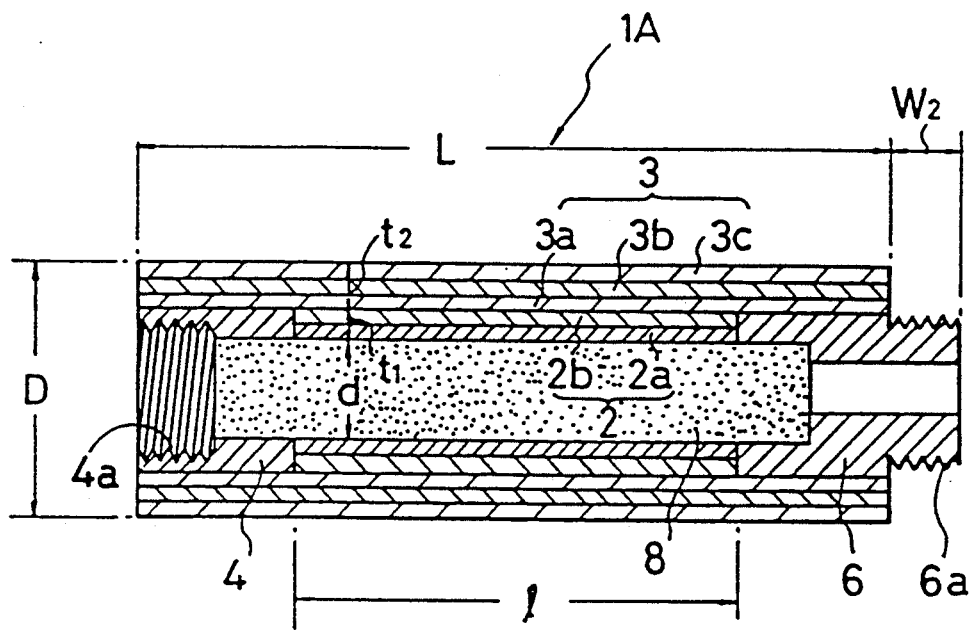
FIG. 9 is a sectional view of an embodiment of the bar-like molding made of fiber-reinforced plastic materials of this invention in the form of a solid shaft.

While in the above description the bar-like molding made of fiber-reinforced plastic materials of this invention is in the form of a hollow pipe made of fiber-reinforced plastic materials, i.e., an FRP pipe, it may also be realized as a solid shaft 1A made of fiber-reinforced plastic materials, as shown in FIG. 9.

The solid shaft made of fiber-reinforced plastic materials shown is realized by embedding a shaft 8 within an FRP pipe of the type shown in FIG. 1. The shaft 8 is preferably made of a light weight metal such as aluminum or a plastic material such as a hard polyurethane foam or a hard polystyrene foam.

Preferably, in order to enhance the collapse strength of the bar-like molding 1 or 1A made of fiber-reinforced plastic materials having the above construction, the outermost layer (e.g., the layer 3c) of the outer fiber-reinforced plastic covering layer 3 thereof, and more preferably the outermost layer (e.g., the layer 3c) of the outer fiber-reinforced plastic covering layer 3 thereof and the inner most layer excluding the protective layer (e.g., the layer 2b) of the inner fiber-reinforced plastic covering layer 2 thereof are formed as layers whose reinforcing fibers are arranged in 90° direction with respect to the axial direction.

Figure 10:
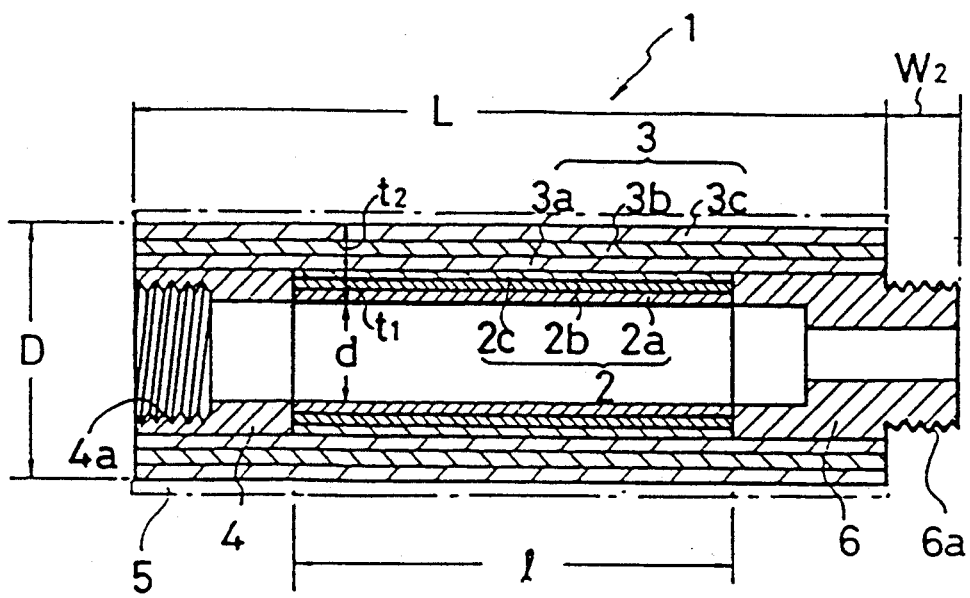
FIG. 10 is a sectional view of another embodiment of the bar-like molding made of fiber-reinforced plastic materials of this invention.
Figure 12:
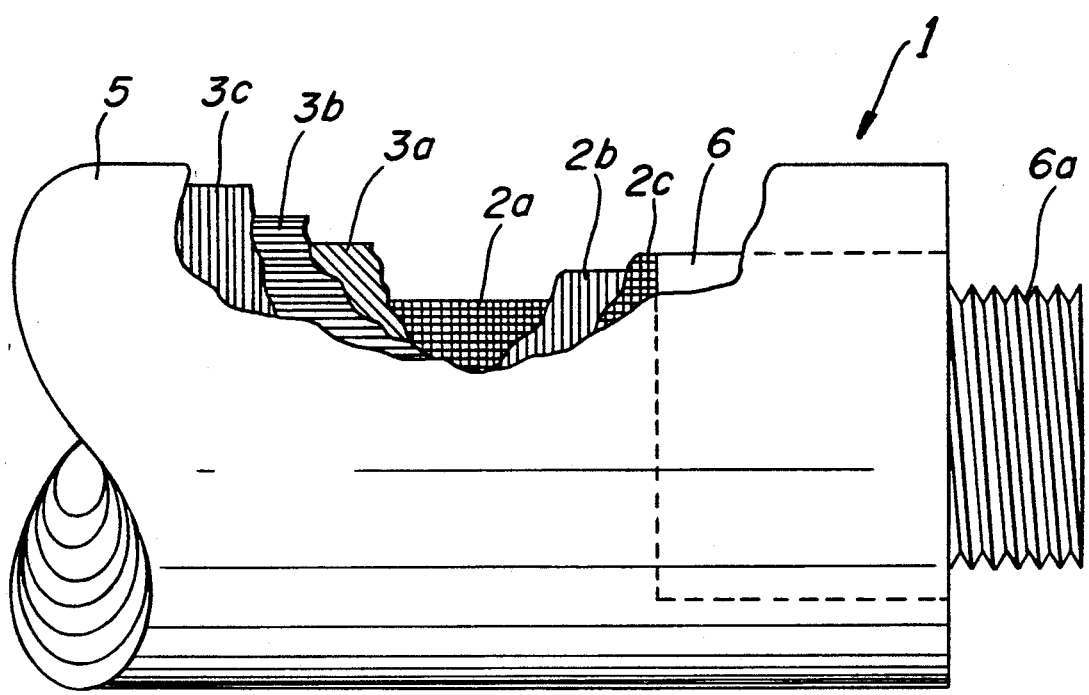
FIG. 12 is a cutaway view of a pipe according to the embodiment of the invention shown in FIG. 10, showing the orientation of the fibers in the various layers.

FIG. 10 shows an embodiment of the bar-like molding made of fiber-reinforced plastic materials of this invention which is designed in accordance with the above conception. In this embodiment, the bar-like molding made of fiber-reinforced plastic materials is realized in the form of an FRP pipe 1 which comprises a fiber-reinforced plastic covering layer consisting of an inner pipe 2 and an outer pipe 3, and short length metal pipes for connection 4 and 6 arranged at the ends of the fiber-reinforced plastic covering layer. This construction is the same as that of the FRP 1 pipe of the embodiment shown in FIG. 1. A cutaway view of the pipe of FIG. 10 is shown in FIG. 12. The shading on the surface of each layer shows the arrangement of fibers in that layer.

In this embodiment, the outer pipe 3 is composed of three fiber-reinforced plastic layers 3a, 3b and 3c, the reinforcing fibers of the fiber-reinforced plastic layer 3b being arranged in the axial direction. The reinforcing fibers of the outermost fiber-reinforced plastic layer 3c are arranged perpendicularly to the axial direction, i.e., they run in the direction 90° from the axial direction. Although it is not to be so limited, the reinforcing fibers of the fiber-reinforced plastic layer 3a may be arranged 45° with respect to the axial direction.

The inner pipe 2 is also composed of a plurality of fiber-reinforced plastic layers; in this embodiment, it consists of three fiber-reinforced plastic layers 2a, 2b and 2c, the reinforcing fibers of the middle fiber-reinforced plastic layer 2b being the innermost layer without taking the protective 2a into consideration being arranged perpendicularly to the axial direction. The fiber-reinforced plastic layer 2c and the protective layer 2a may be made of glass fiber cloth prepreg.

If it is so required, the fiber-reinforced plastic layers 3c and 2b having the reinforcing fibers arranged perpendicular to, or 90° to, the axial direction, may formed by alternately laminating the layers with the reinforcing fibers arranged 90° to the axial direction and the layer with the reinforcing fibers arranged in the axial direction.

As in the first embodiment, a protective layer 5 may be provided outside the outermost layer 3c of the outer pipe 3, the construction of this protective layer being the same as in the first embodiment.

In accordance with this invention, the layer 2b of the inner pipe 2 shown in FIG. 2 will not always be necessary. However, providing a layer whose reinforcing fibers are arranged 90° with respect to the axial direction as the innermost layer when excluding the protective layer results in a very high collapse strength of the FRP pipe 1.

The bar-like molding made of fiber-reinforced plastic materials of this invention thus constructed as well as the method of manufacturing the same will now be described more specifically with reference to embodiments thereof.

Embodiments 1 and 2

As shown in FIG. 11, an elongated mandrel 10 comprising a main body section 10a and a reduced diameter section 10b was prepared. The length L1 of the main body section 10a was 1550 mm, the length L2 of the reduced diameter section 10b being 300 mm (FIG. 11(A)). The mandrel 10 had a circular cross-sectional configuration; the diameter D1 of the main body section 10a was 98 mm, the diameter D2 of the reduced diameter section 10b being 85 mm.

An inner fiber-reinforced plastic covering layer (inner pipe) 2 having a length of 1,000 mm (l+2Δl) and a thickness of 6.0 mm was formed on the mandrel 10.

More particularly, the inner pipe 2 was composed of an inner fiber-reinforced plastic layer 2a which was first formed by winding around the mandrel 10 glass fiber cloth prepreg prepared by using glass fiber as the reinforcing fibers and epoxy resin as the matrix resin, with the usual winding method. The thickness of the inner fiber-reinforced plastic layer 2a was 1 mm.

Afterwards, carbon fiber prepreg prepared by using carbon fibers as the reinforcing fibers and epoxy resin as the matrix resin was wound around the layer 2a by the usual winding method in such a manner that the fibers thereof are arranged in the axial direction, thereby forming a fiber-reinforced plastic layer 2b, the thickness of which was 5 mm.

Figure 11A:
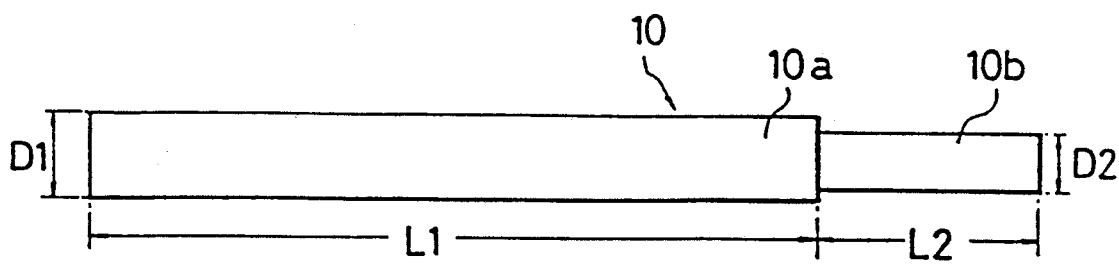
FIGS. 11(A) to 11(D) are diagrams illustrating the process of manufacturing the bar-like molding made of fiber-reinforced plastic materials of this invention.
Figure 11B:
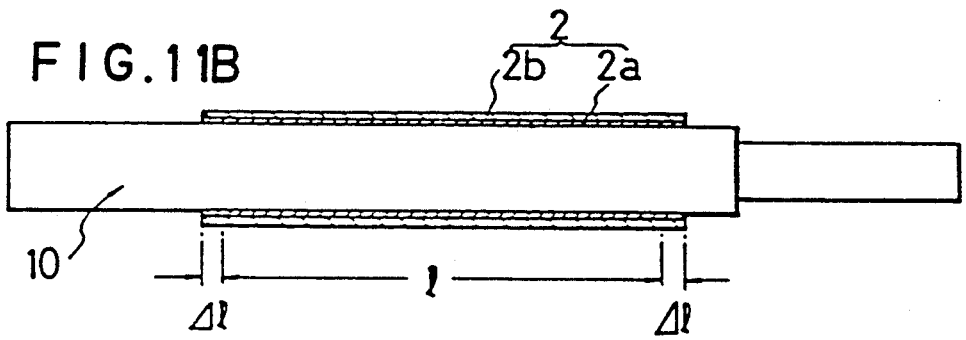

The end sections of the inner pipe 2 were then cut off by a length Δl = 10 mm, thereby forming an inner pipe having a predetermined length l=980 mm (FIG. 11(B)).

Figure 11C:
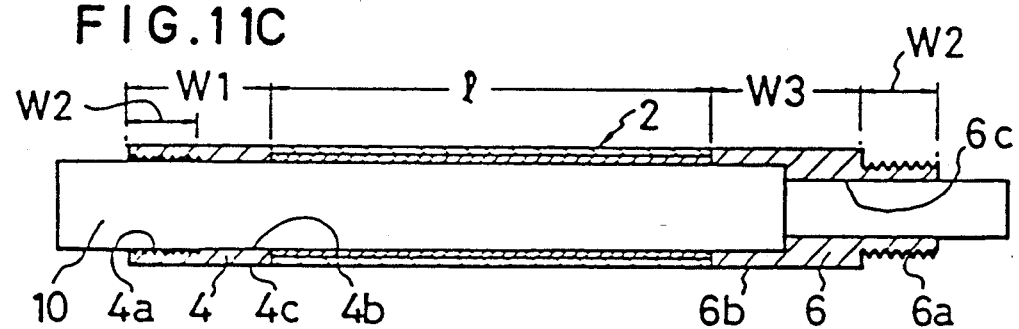

Afterwards, short length steel pipes for connection 4 and 6 having an uneven surface configuration were put on the end sections of the mandrel 10, and were abutted against the ends of the first fiber-reinforced plastic layer, i.e., the first fiber-reinforced plastic hollow pipe 2a (FIG. 11(C)).

The short length steel pipe for connection 4 put on the main body section 10a of the mandrel 10 was a short length pipe having a female screw, as shown in FIG. 2. It consisted of a female screw section 4a having an inner diameter of 98 mm and including a pipe parallel screw thread such as JIS. PF5. and a mounting section 4b having an inner diameter of 98.5 mm. Its outer diameter was 110 mm. In particular, its outer periphery 4c had an uneven surface configuration with a double-cut pattern of 0.5 m (module) as prescribed in JIS B 0951. In particular, the knurlizing angle (that the double cut makes with respect to the axial direction) was changed from the 30° prescribed in said JIS to 45°.

The short length steel pipe for connection 6 put on the reduced diameter section 10b of the mandrel 10 was a short length pipe having a male screw, as shown in FIG. 3. Its inner periphery had a complementary configuration with respect to the reduced diameter section 10b of the mandrel 10. It comprised a stepped mounting hole section 6c having inner diameters 85.5 mm and 98.5 mm, an outer periphery 6b having an outer diameter of 110 mm, and a male screw section 6a having an outer diameter 98 mm and a pipe parallel screw thread such as JIS.PF5. The outer periphery 6b had the same uneven surface configuration as that of the short length pipe 4 having a female screw.

In this embodiment, the length w2 of the screw sections 4a and 6a was 130 mm. Both of the lengths w1 and w3 of the outer peripheries 4c and 6b having an uneven surface configuration were 260 mm.

Subsequently, an outer fiber-reinforced plastic covering layer or an outer pipe 3 was formed in such a manner as to cover the respective outer peripheries of the inner pipe 2 and the short length metal pipes 4, 6. The outer pipe 3 had a length L of 1500 mm, an outer diameter D of 120 mm and a wall thickness t2 of 5 mm. It consisted of three laminated fiber-reinforced plastic layers 3a, 3b and 3c. The innermost layer 3a and the outermost layer 3c were formed as fiber-reinforced plastic layers whose reinforcing fibers were arranged at an angle of 45° from the axial direction, the middle layer 3b being formed as a fiber-reinforced plastic layer whose reinforcing fibers were arranged in the axial direction.

The fiber-reinforced plastic layers 3a, 3b and 3c were formed by winding carbon fiber prepreg prepared by using carbon fibers as the reinforcing fibers and epoxy resin as the matrix resin, with the usual winding method. The thicknesses of fiber-reinforced plastic layers 3a, 3b and 3c were 1 mm, 3 mm and 1 mm, respectively (FIG. 11(D)).

The fiber-reinforced plastic layers thus wound around the mandrel 10 were cured. In this embodiment, the curing temperature was raised to 130° C. at the rate of 10° C./min, which was held for two hours, and then cooled down at the rate of 10° C./min.

Figure 11D:
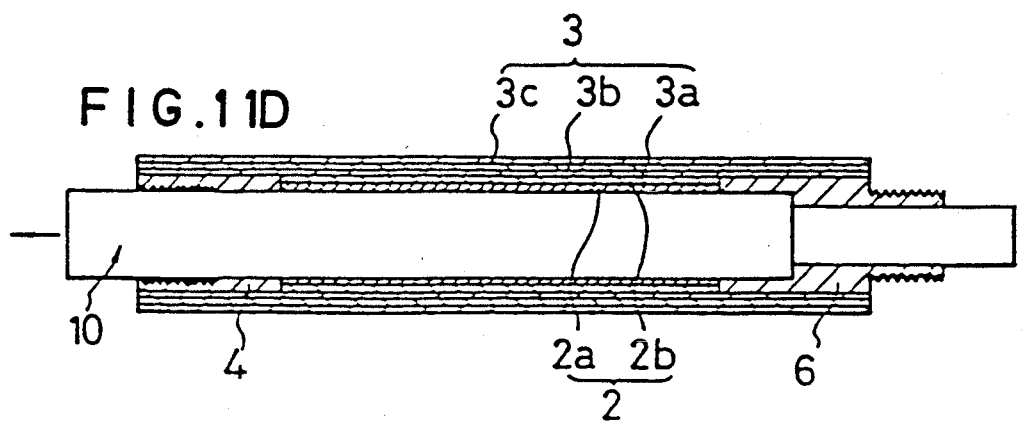

After the cooling, the mandrel 10 was pulled out in the direction indicated by the arrow in FIG. 11(D). The end surface sections of the outer pipe 3 were shaped by appropriately cutting the same. Thus, a bar-like molding made of fiber-reinforced plastic materials 1 in the form of a pipe shown in FIG. 1 was obtained. It exhibited a circular cross-sectional configuration, and had a total length L of 1500 mm (excluding the male screw protrusion w2=130 mm), and an outer diameter D of 120 mm.

An experiment was conducted by preparing different FRP pipes 1 using different reinforcing fibers for the fiber-reinforced plastic layers 2b, 3a, 3b and 3c. Table 1 shows the result of the experiment.

In Embodiment 1, carbon fibers having a tensile strength of 3000 MPa and an ultrahigh elastic modulus of 700 GPa were employed for the inner pipe 2. For the outer pipe 3, high elastic modulus carbon fibers having a tensile strength of 3000 MPa and an elastic modulus of 500 GPa were employed.

In Embodiment 2, high elastic modulus carbon fibers having a tensile strength of 3000MPa and an elastic modulus of 500GPa were employed for both the inner and outer pipes 2 and 3.

Boring Test

Using a drifter (MDH100-A manufactured by Mitsubishi Heavy Industries, Ltd.), a rock was bored while imparting percussions through two pipes connected together (an FPR pipe to the drifter side and a steel casing to the boring point side) by the double-pipe drilling system. The boring depth was measured after continuing the operation for five minutes. The operation was performed under the following conditions.

Rotating speed: 1650 bpm
Torque:
 20 to 40 kg/cm² (hydraulic pressure)
 80 to 160 kg.m
Feed Force:
 50 kg/cm² (hydraulic pressure)
 830 kg Embodiment 3

An FRP pipe was prepared in the same manner as in Embodiment 1, except for the fact that the fiber-reinforced plastic layer 2b of the inner pipe 2 was not formed. A boring test was performed in the same manner as in Embodiments 1 and 2. The result of the test is shown in Table 1.

Embodiment 4

An FRP pipe was prepared in the same manner as in Embodiment 1, except for the fact that no fiber-reinforced plastic layer 3b was formed in the outer pipe 3, and that high elastic modulus carbon fibers having a tensile strength of 3000 MPa and an elastic modulus of 500 GPa were employed for the fiber-reinforced plastic layer 2b of the inner pipe 2. A boring test was performed in the same manner as in Embodiments 1 and 2. The result of the test is shown in Table 1.

Embodiment 5

An FRP pipe was prepared in the same manner as in Embodiment 1, except for the fact that no fiber-reinforced plastic layer 2b was formed in the inner pipe 2, and that ordinary carbon fibers having an elastic modulus of 240 GPa were employed for the fiber-reinforced plastic layer 3b of the outer pipe 3. A boring test was performed in the same manner as in Embodiments 1 and 2. The result of the test is shown in Table 1.

Comparison Example 1

An FRP pipe was prepared in the same manner as in Embodiment 1, except for the fact that the reinforcing fibers of both of the fiber-reinforced plastic layers 2b and 3b of the inner and outer pipes 2 and 3 were arranged at an angle of 45° from the axial direction, and that high elastic modulus carbon fibers having an elastic modulus of 500 GPa were employed for the fiber-reinforced plastic layers 2b and 3b of the outer and inner pipes 2 and 3. A boring test was performed in the same manner as in Embodiments 1 to 4. The result of the test is shown in Table 1.

Comparison Example 2

A boring test was conducted in the same manner as in Embodiments 1 to 4 using a steel pipe having a length of 1500 mm, an outer diameter of 120 mm, and a wall thickness of 6.5 mm. The result of the test is shown in Table 1.

Embodiment 6

As shown in FIG. 11, an elongated mandrel 10 comprising a main body section 10a and a reduced diameter section 10b was prepared. The length L1 of the main body section 10a was 1550 mm, the length L2 of the reduced diameter section 10b being 300 mm (FIG. 11(A)). The mandrel 10 had a circular cross-sectional configuration; the diameter D1 of the main body section 10a was 98 mm, the diameter D2 of the reduced diameter section 10b being 85 mm.

An inner fiber-reinforced plastic covering layer (inner pipe) 2 having a length of 1,000 (l+2Δl) and a thickness of 7.0 mm was formed on the mandrel 10.

More particularly, the inner pipe 2 was composed of an inner fiber-reinforced plastic layer 2a which was first formed by winding around the mandrel 10 carbon fiber prepreg prepared by using carbon fibers as the reinforcing fibers and epoxy resin as the matrix resin, with the usual winding method in such a manner that the fibers are alternately arranged in the axial direction and in 90° direction to the axial direction. The thickness of the inner fiber-reinforced plastic layer 2a was 2 mm.

Afterwards, glass fiber cloth prepreg prepared by using glass fibers as the reinforcing fibers and epoxy resin as the matrix resin was wound around the layer 2a by the usual winding method, thereby forming a fiber-reinforced plastic layer 2b, the thickness of which was 5 mm.

The end sections of the inner pipe 2 were then cut off by a length Δl=10 mm, thereby forming an inner pipe having a predetermined length l=980 mm (FIG. 11(B)).

Afterwards, short length steel pipes for connection 4 and 6 having an uneven surface configuration were inserted into the mandrel 10 at the end sections thereof, and were abutted against the ends of the first fiber-reinforced plastic layer, i.e., the first fiber-reinforced plastic hollow pipe 2 (FIG. 11(C)).

The short length steel pipe for connection 4 put on the main body section 10a of the mandrel 10 was a short length pipe having a female screw, as shown in FIG. 2. It consisted of a female screw section 4a having an inner diameter of 98 mm and including a pipe parallel screw thread such as JIS. PF5, and a mounting section 4b having an inner diameter of 98.5 mm. Its outer diameter was 112 mm. In particular, its outer periphery 4c had an uneven surface configuration with a double-cut pattern of 0.5 m (module) as prescribed in JIS B 0951. In particular, the knurlizing angle (that the double cut makes with respect to the axial direction) was changed from the 30° prescribed in said JIS to 45°.

The short length steel pipe for connection 6 put on the reduced diameter section 10b of the mandrel 10 was a short length pipe having a male screw, as shown in FIG. 3. Its inner periphery had a complementary configuration with respect to the reduced diameter section 10b of the mandrel 10. It comprised a stepped mounting hole section 6c having inner diameters 85.5 mm and 98.5 mm, an outer periphery 6b having an outer diameter of 112 mm, and a male screw section 6a having an outer diameter 98 mm and a pipe parallel screw thread such as JIS.PF5. The outer periphery 6b had the same uneven surface configuration as that of the short length pipe 4 having a female screw.

In this embodiment, the length w2 of the screw sections 4a and 6a was 130 mm. Both of the lengths w1 and w3 of the outer peripheries 4c and 6b having an uneven surface configuration were 260 mm.

Subsequently, an outer fiber-reinforced plastic covering layer or an outer pipe 3 was formed in such a manner as to cover the respective outer peripheries of the inner pipe 2 and the short length metal pipes 4, 6. The outer pipe 3 had a length L of 1500 mm, an outer diameter D of 122 mm and a wall thickness t2 of 5 mm. It consisted of three laminated fiber-reinforced plastic layers 3a, 3b and 3c. The innermost layer 3a was formed as a fiber-reinforced plastic layer whose reinforcing fibers were arranged at an angle of 45° from the axial direction, the middle layer 3b being formed as a fiber-reinforced plastic layer whose reinforcing fibers were arranged in the axial direction. The outermost layer 3c was formed as a fiber-reinforced plastic layer whose reinforcing fibers were alternately arranged in the axial direction and in the 90° direction to the axial direction.

The fiber-reinforced plastic layers 3a, 3b and 3c were formed by winding carbon fiber prepreg prepared by using carbon fibers as the reinforcing fibers and epoxy resin as the matrix resin, with the usual winding method. The thicknesses of fiber-reinforced plastic layers 3a, 3b and 3c were 2 mm, 1 mm and 2 mm, respectively (FIG. 11(D)).

The fiber-reinforced plastic layers thus wound around the mandrel 10 were cured. In this embodiment, the curing temperature was raised to 130° C. at the rate of 10° C./min, which was held for two hours, and then cooled down at the rate of 10° C./min.

After the cooling, the mandrel 10 was pulled out in the direction indicated by the arrow in FIG. 11(D). The end surface sections of the outer pipe 3 were shaped by appropriately cutting the same. Thus, a bar-like molding made of fiber reinforced plastic materials 1 in the form of a pipe as shown in FIGS. 1 and 10 was obtained. It exhibited a circular cross-sectional configuration, and had a total length L of 1500 mm (excluding the male screw protrusion w2=130 mm), and an outer diameter D of 120 mm.

An experiment was conducted by preparing different FRP pipes 1 using different reinforcing fibers for the fiber-reinforced plastic layers 2b, 3a, 3b and 3c. Table 1 shows the result of the experiment.

In this embodiment, the usual carbon fibers having a tensile strength of 3000 MPa and an ultrahigh elastic modulus of 240 GPa were employed. A boring test was performed in the same manner as in Embodiments 1 and 2. The result of the test is shown in Table 1. Further, a collapse test was effected by imparting a clamping force of 33 tons on the outer periphery of the pipe at the middle portion and in the diametrical direction thereof. No fracture was occurred. The pipe manufactured according to Comparison Example 1 mentioned above was tested in the same manner as in Example 6. The pipe was completely failured at the portions clamped or the fiber-reinforced plastic portions.

TABLE 1

|  | Stiffness (ton) | | Torque Kg/cm² | Boring speed |
| --- | --- | --- | --- | --- |
|  | Inner pipe | Outer pipe | (Kg · m) | mm/min |
| Embodiment 1 | 38800 | 22400 | 60 (225) | 59.0 |
| Embodiment 2 | 31000 | 19400 | 60 (225) | 45.0 |
| Embodiment 3 | 4000 | 20000 | 60 (225) | 41.0 |
| Embodiment 4 | 20000 | 4000 | 60 (225) | 35.0 |
| Embodiment 5 | 4000 | 13200 | 60 (225) | 31.3 |
| Embodiment 6 | 8400 | 14000 | 60 (225) | 33.0 |
| Comparison 1 | 3700 | 4100 | 60 (225) | 7.0 |
| Comparison 2 | 48600 | | 60 (225) | 54.7 |

As will be appreciated from the above embodiments and comparison examples, the bar-like molding made of fiber-reinforced plastic materials in accordance with this invention provides an increased stiffness in the axial direction in a fiber-reinforced plastic pipe as well as enhanced impulsive transmission characteristics thereof, with the result that a remarkably improved boring efficiency can be attained. In particular, those employing high elastic modulus or ultrahigh elastic modulus carbon fibers as in Embodiments 1 and 2 can attain a boring efficiency equal or superior to that attained by conventional boring casing using steels.

While the above embodiments employ carbon fibers for the fiber-reinforced plastic layers, they can employ other types of fibers, as stated above. Further, while in the above embodiments glass fiber cloth prepreg is employed for the fiber-reinforced plastic layer 2a serving as a protective layer, other types of reinforcing fibers can be employed for it.

When all the fiber-reinforced plastic layers are formed from prepreg, the curing process can be conducted simultaneously after all of them have been wound around the mandrel, as described above. However, the curing may be individually performed for each layer.

When manufacturing a bar-like molding made of fiber-reinforced plastic materials in the form of a solid shaft such as shown in FIG. 9, the embedded shaft 8 may be utilized as the mandrel, thereby providing a bar-like molding made of fiber-reinforced plastic materials of the mandrel built-in type.

Further, at least the outermost layer of the outer fiber-reinforced plastic covering layer, more preferably the outermost layer of the outer fiber-reinforced plastic covering layer and the inner most layer of the inner fiber-reinforced plastic layer may be formed as layers whose reinforcing fibers are arranged 90° to the axial direction, thereby enhancing the collapse strength of the bar-like molding made of fiber-reinforced plastic materials.

Having the above-described construction, the bar-like molding made of fiber-reinforced plastic materials of this invention has relatively light weight, free from corrosion problems, and is capable of transmitting a considerably high torque and impulsion. In addition, the molding in accordance with this invention is characterized by its ability to withstand intensive percussions and its high stiffness in the axial direction, so that, when used as a boring casing, it can provide an improved boring efficiency. Furthermore, it is advantageous in that the plastic pipe thereof does not suffer strength degradation if it undergoes machining or the like, and that it exhibits a high tensile strength and a high internal pressure resistance. Since it can be extended by connecting pieces thereof, it will be suited for various purposes.

What is claimed is:

1. A boring casing of the type which can be connected together to extend the drilling column of an earth boring machine, comprising:

(a) a short length metal pipe connector arranged at each end of the boring casing for connecting successive casing to each other or to metal drilling pipes, each of said short length metal pipe connectors having an uneven surface on its outer periphery;

(b) an inner pipe structure composed of a plurality of coaxial fiber-reinforced plastic layers, said inner pipe abutting at each of its ends against a respective one of the short length metal pipe connectors;

(c) an outer pipe structure laminated over and covering the outer peripheries of said inner pipe structure and the uneven surfaces of said short length metal pipe connectors, said outer pipe composed of a plurality of coaxial fiber-reinforced plastic layers;

(d) an outer protective layer formed by a metal sleeve which is provided on the surface of the outermost layer of the outer pipe structure; and (e) wherein said coaxial fiber-reinforced plastic layers include:
  (i) at least one fiber-reinforced plastic layer whose reinforcing fibers are carbon fibers arranged in the axial direction of the boring casing, and
  (ii) at least one fiber-reinforced plastic layer whose reinforcing fibers are arranged 90° to the axial direction of the boring casing.

2. A boring casing as in claim 1, wherein said carbon fibers arranged in the axial direction have an elastic modulus of more than 240 GPa.

3. A boring casing as in claim 2, wherein said carbon fibers arranged in the axial direction have an elastic modulus in the range of 400 to 800 GPa.

4. A boring casing of claim 1, wherein if only one of said plurality of fiber-reinforced plastic layers has carbon reinforcing fibers arranged in the axial direction, that one layer is in the outer pipe.

5. A boring casing as in claim 1, wherein at least one of said plurality of fiber-reinforced plastic layers of each of said inner pipe and said outer pipe is a layer whose reinforcing fibers are carbon fibers arranged in the axial direction of the boring casing.

6. A boring casing as in claim 5, wherein said carbon fibers arranged in the axial direction have an elastic modulus of more than 240 GPa, preferably in the range of 400 to 800 GPa.

7. A boring casing as in claim 1, wherein at least the outermost layer of the outer pipe structure is a layer having its reinforcing fibers arranged 90° to the axial direction.

8. A boring casing as in claim 7, wherein the innermost layer of the inner pipe structure is a layer having whose reinforcing fibers are arranged 90° to the axial direction.

9. A boring casing as in claim 1, further comprising the innermost layer of the inner pipe structure being a protective layer formed with glass fibers.

10. A boring casing as in claim 1 or claim 5, wherein glass fibers or aramid fibers are employed as the reinforcing fibers except for the layers having said axially arranged carbon reinforcing fibers, and wherein the matrix resin is a resin selected from the group consisting of:
  the following thermosetting resins:
  epoxy resin, unsaturated polyester resin, urethane acrylate, vinyl ester, phenol, or polyurethane, and
  the following thermo-plastic resins:
  polyamide 6, polyamide 66, polyamide 12, polybutylene terephthalate, polyethylene terephthalate, polycarbonate, polyacetal, polyphenylene sulfide, polyether ether ketone, polyether sulfide, polyphenylene oxide, modified polyphenylene oxide, polypropylene, or polyvinyl.

* * * * *